United States Patent Office 3,090,115
Patented May 21, 1963

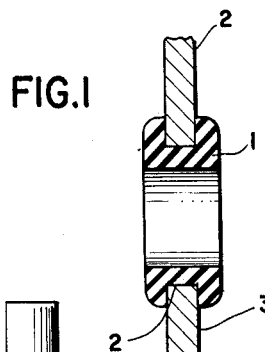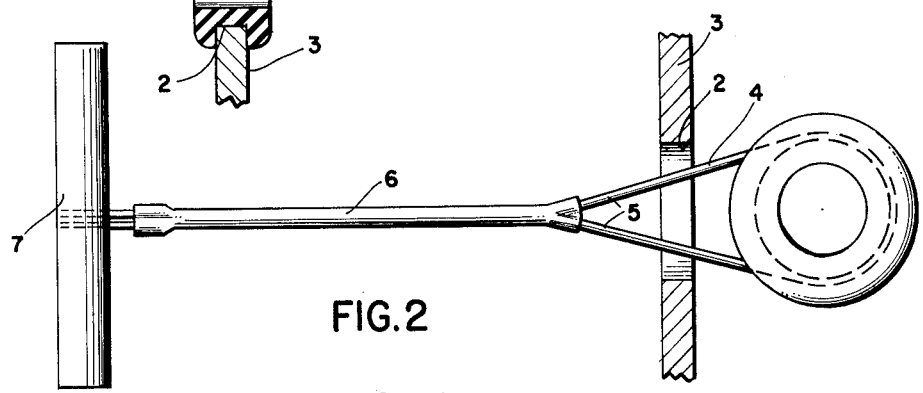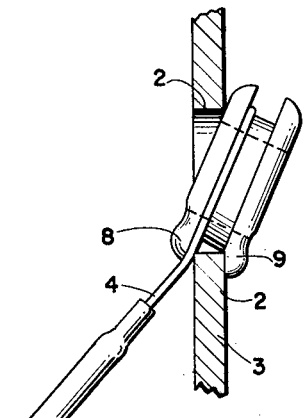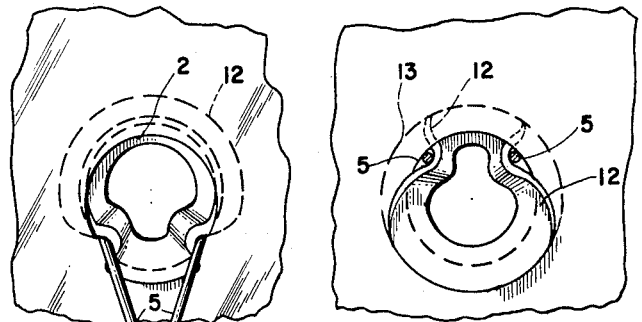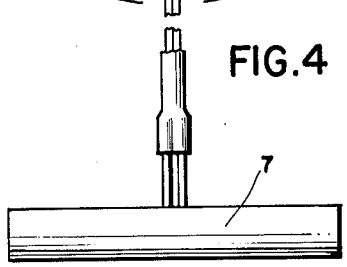
INVENTOR.
JAMES C. CARR

3,090,115
METHOD OF INSTALLING GROMMETS
James C. Carr, Roanoke, Va., assignor to General Electric Company, a corporation of New York
Filed May 22, 1961, Ser. No. 111,618
1 Claim. (Cl. 29—450)

My invention relates to method of installing grommets in apertures which they are designed to fit.

It has for one of its objects to provide a simple method of installing grommets in apertures, which they are designed closely to fit, and which method and means may be employed by employees, both masculine and feminine, in factory operations, effectively, without injury to the fingers or hands of the employee.

Usually grommets of the type here referred to are made of solid rubber of substantial thickness comprising a usually cylindrical body which, when installed, extends through the aperture, closely fitting its periphery, and has outwardly extending flanges which embrace the face of the material about the aperture on both sides of the material. Such solid rubber grommets have some degree of flexibility, both in the flanges and in the cylindrical body but it is insufficient to permit installation, particularly by feminine employees, without use of a proper tool. This problem has been long recognized, and somewhat expensive tools of some complexity, adapted for both power operations and manual operation, have been devised for the installation of such grommets. Such tools are shown in United States Patents 2,559,847, 2,759,255, 2,961,755, 2,457,930, 2,468,286 and 2,657,818.

A further object of my invention is to provide a method of installing such grommets in which a simple tool may be used for the expeditious and effective installation of grommets.

In accord with my invention, a simple flexible cable, preferably of woven or twisted steel wire, is formed into a loop which may be placed around the body of the grommet between the flanges, the legs of the loop extending therefrom to a suitable handle by which tension may be manually applied to the loop. Preferably the legs of the loop extend through an elongated slide, which may be tubular, or other suitable shape, large enough to pass the two legs of the loop and which may slide along the legs to and from the grommet to bring the legs as close together as may be desired in the region near the grommet.

In the installation of the the grommet the loop of the tool is passed through the aperture in which the grommet is to be installed the grommet then positioned in the loop and the legs of the loop are pulled taut with the grommet closing the aperture on the far side, the near flange of the grommet being distorted by the loop to extend the portion between the legs of the loop through the aperture, and with the remote flange of the grommet engaging the far side of the material at the point where the near flange extends through the aperture. Then, while maintaining, or increasing, the tension and working the handle to the right and left, thereby working the legs outwardly and upwardly along the periphery of the aperture, more and more of the near flange may be worked through the aperture, until the body portion finally flexes sufficiently to permit the remaining portion of the near flange to pass the aperture between the body portion and the periphery. Thereupon the tool may be removed by pulling the remaining portion of the near flange through the aperture, and the grommet assumes its normal form fitting the aperture.

The novel features which I believe to be characteristic of my invention are set forth with particularity in the appended claim. My invention, itself, however, may best be understood by reference to the following description taken in connection with the accompanying drawing in which FIG. 1 illustrates a cross section of a grommet in connection with which my invention may be applied, installed in an aperture which it is designed to fit; FIG. 2 illustrates the tool for installation of such grommets; FIG. 3 illustrates a grommet in the initial stage of its installation; FIG. 4 illustrates it at a somewhat later stage; and FIG. 5 illustrates the grommet in a still later, but not final, stage of its installation.

Referring to FIG. 1, I have shown at 1 a cross section of a grommet having proportions as to body and flange thickness and width quite common in commercial grommets. As shown in FIG. 1, the grommet is installed in an aperture 2 in a sheet of material 3, which may be a chassis of an electrical apparatus.

FIG. 2 shows the grommet 1 about to be installed in aperture 2 in material 3 by the tool about to be described. This tool comprises a strong flexible cable 4, preferably of woven or twisted steel wire, which extends about the grommet 1 between the flanges thereof to form a loop, the legs of the loop 5 passing through a slide 6 which may embrance the two legs, holding them together near the grommet, to a handle 7 to which the ends of the legs may be attached in any suitable way. Slide 6 is arranged to slide upon the cable 4 to bear the legs 5 together or apart, as desired, in the installation of the grommet. In the initial step of the installation it may be desirable that the legs of the loop be quite close together near the grommet. In later stages in the installation they may be farther apart as the wide portion of the grommet is worked through the aperture.

In the initial installation of the grommet it may be placed in the position shown in FIG. 3 with respect to the aperture 2 with the inner flange distorted to some extent, as shown in 8, and pulled through the aperture sufficiently to bring the outer flange against the material 3, as shown at 9. Now, by pulling on the handle and thereby placing tension upon the cable 4, and particularly by working it to the right and left by means of the handle, as shown by the arrows 11 in FIG. 4, more and more of the near flange may be worked through the aperture.

In FIG. 4 the dotted line 12 represents the outer periphery of the near flange and the line 2 represents the aperture. This working of the sides of the near flange through the aperture is readily effected by the side-wise movement of the handle 7, particularly as the legs are alternately moved outwardly and upwardly along the lateral sides of the aperture, as illustrated in FIGS. 4 and 5, to work the wide portion of the near flange through the aperture.

FIG. 5 shows a later stage in the installation of the grommet with the legs of the loop 5 extending through the aperture near the top. In this figure the line 12 again represents the periphery of the near flange and the line 13 the periphery of the outer flange as it comes against the material 3. In FIG. 5 enough of the inner flange is through the aperture so that the body of the grommet distorts adequately to permit the balance of the near flange to be drawn through the aperture by the application of tension to the loop.

It has been found in the use of the device by feminine employees in the factory that grommets about the actual size of those shown in the drawing, and grommets both smaller and larger, may readily be installed by the operator without difficulty or harm to herself.

While I have shown a particular embodiment of my invention, it will, of course, be understood that I do not wish to be limited thereto and that I contemplate by the appended claims to cover any modifications therein falling within the true spirit and scope of my invention.

What I claim as new and desire to secure by Letters Patent of the United States is:

The method of installing a grommet having a cylindrical body with flexible flanges extending radially outwardly in parallel relationship from the ends thereof, into an aperture in material of thickness substantially equal to the distance between said flanges and of a diameter substantially equal to the external diameter of said cylindrical body, which comprises placing about said body a loop of cable having the ends extending through said aperture, placing a portion of the near flange through the aperture diametrically opposite the side of said body with the loop of cable therearound and the balance adjacent thereto, pulling the cable taut in an angular direction with respect to the plane containing said aperture to flex said near flange and body and to squeeze them through said aperture, moving the taut cable by sideways motion about the axis of the grommet along the periphery of the aperture to work more and more of the near flange through the aperture thereby relieving the flex of the near flange until said body portion at the side opposite the cable ends enters the aperture, and pulling the remaining part of the near flange through the aperture to release the cable, leaving the grommet installed in the aperture.

References Cited in the file of this patent

UNITED STATES PATENTS

| | | |
|---|---|---|
| 1,505,897 | Kikta | Aug. 19, 1924 |
| 2,357,595 | McPherson | Sept. 5, 1944 |
| 2,466,952 | Jakubowski | Apr. 12, 1949 |